(12) United States Patent
Alyassin

(10) Patent No.: US 7,136,516 B2
(45) Date of Patent: Nov. 14, 2006

(54) METHOD AND SYSTEM FOR SEGMENTING MAGNETIC RESONANCE IMAGES

(75) Inventor: Abdalmajeid Musa Alyassin, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 708 days.

(21) Appl. No.: 09/683,621

(22) Filed: Jan. 25, 2002

(65) Prior Publication Data

US 2003/0142857 A1    Jul. 31, 2003

(51) Int. Cl.
  *G06K 9/00* (2006.01)
(52) U.S. Cl. ............... 382/128; 382/164; 378/28
(58) Field of Classification Search ........ 382/128–133, 382/154, 164, 165, 169–171, 173, 184, 224, 382/236, 260, 274, 282, 285, 305, 191, 203; 324/309; 600/410; 378/28, 37, 62; 345/424, 345/427; 348/43, 46, 254
See application file for complete search history.

(56) References Cited

U.S. PATENT DOCUMENTS

| | | | | |
|---|---|---|---|---|
| 5,410,250 A | * | 4/1995 | Brown | 324/309 |
| 5,422,576 A | * | 6/1995 | Kao et al. | 324/309 |
| 5,603,322 A | * | 2/1997 | Jesmanowicz et al. | 600/410 |
| 5,709,206 A | * | 1/1998 | Teboul | 600/437 |
| 5,768,413 A | * | 6/1998 | Levin et al. | 382/173 |
| 5,812,691 A | * | 9/1998 | Udupa et al. | 382/128 |
| 5,859,891 A | * | 1/1999 | Hibbard | 378/62 |
| 6,219,571 B1 | * | 4/2001 | Hargreaves et al. | 600/410 |
| 6,430,430 B1 | * | 8/2002 | Gosche | 600/410 |

OTHER PUBLICATIONS

M. Kaus, SK Warfield, FA Jolesz and R. Kikinis, "Adaptive Template Moderated Brain Tumor Segmentation In MRI". Surgical Planning Lab, Dept of Radiology, Brigham & Women's Hospital, Harvard Medical School. www.spl.harvard.edu/8000/pages/papers/kaus/bvm99/. pp. 1-5.

MR Kaus, SK Warfield, A. Nabavi, PM Black, FA Jolesz, R. Kikinis, "Automated Segmentation of MRI of Brain Tumors". Surgical Planning Lab, Dept of Radiology, Brigham & Women's Hospital, Harvard Medical School. www/spl.harvard.edu:8000/pages/papers/kaus/radiology2001/text.html, pp. 1-13.

* cited by examiner

*Primary Examiner*—Jing Ge Wu
*Assistant Examiner*—Seyed Azarian
(74) *Attorney, Agent, or Firm*—Fletcher Yoder

(57) ABSTRACT

A method for segmenting magnetic resonance (MR) images of an anatomical body of interest, for example the brain, comprises classifying a plurality of selected structures within the body of interest based on a plurality of image processing computations wherein the computations are adapted to relate respective T2 relaxation times corresponding to each of the structures. Thereafter, the method comprises segmenting the MR images for each of the structures substantially concurrently based on the plurality of image computations. A system for automatically segmenting magnetic resonance (MR) images of an anatomical body of interest comprises a processor coupled to an MR image acquisition device wherein the processor is adapted to perform concurrent segmentation computations for a plurality of selected structures within the anatomical body of interest. The system further comprises an interface unit coupled to the processor adapted to present information relating to the segmented computations corresponding to the plurality of selected structures.

14 Claims, 4 Drawing Sheets

METHOD AND SYSTEM FOR SEGMENTING MAGNETIC RESONANCE IMAGES

BACKGROUND OF INVENTION

The invention relates to magnetic resonance imaging (MRI) and image processing methods. More particularly, the invention relates to segmenting brain images into various structures found within the brain.

It is well known to employ MRI for visualization of internal anatomical structures such as brain imaging. Brain imaging, and particularly for use in brain volume measurement is of particular interest for studying degenerative brain diseases such as Alzheimer's disease (AD). Examination of the Alzheimer brain pathology shows extensive β-amyloid plaque, neuron tangles and brain atrophy. Typically, magnetic resonance imaging brain volume measurements are used to monitor the disease progression. Normal aging brain atrophy is only about a 3.5% decrease per decade, but the rate of atrophy increases in subjects exhibiting dementia. Thus, brain volume measurements provide a measurable correlation available to predict Alzheimer's disease. The diagnosis of other brain diseases such as tumors and edema also rely on brain volume measurement.

Segmentation techniques typically require some user interaction such as placing a seed point within an area of interest in order to initiate segmentation or registration processing. Further, in order to segment multiple structure or multiple tissue types within the brain generally requires repeating the seed placement and subsequent processing for the selected structure or tissue type. Thus, measuring brain volume from magnetic resonance images either by registration methods or by segmentation methods is typically tedious because there is considerable manual editing and processing needed.

Measurement of brain structures could lead to important diagnostic information and could also indicate the success or failure of a certain pharmaceutical drug. A necessary step to quantify brain structures is the availability of a segmentation technique of some sort. Other techniques, such as neural network techniques require a training stage for the algorithm. These techniques are time consuming, which make them less clinically desirable. Therefore, there is a need for a fast and accurate unsupervised segmentation technique.

What is needed is a method and system for segmenting medical images in an automatic manner with minimal user intervention. What is further needed is a method for segmenting medical images for a plurality of structures within an anatomical body of interest.

SUMMARY OF INVENTION

In a first aspect, a method is provided for segmenting magnetic resonance (MR) images of an anatomical body of interest, for example the brain. The method comprises classifying a plurality of selected structures within the body of interest based on a plurality of image processing computations wherein the computations are adapted to relate respective T2 relaxation times corresponding to each of the structures. Thereafter, the method comprises segmenting the MR images for each of the structures substantially concurrently based on the plurality of image computations.

In a second aspect, a system is provided for automatically segmenting magnetic resonance (MR) images of an anatomical body of interest. The system comprises a processor coupled to an MR image acquisition device wherein the processor is adapted to perform concurrent segmentation computations for a plurality of selected structures within the anatomical body of interest. The system further comprises an interface unit coupled to the processor adapted to present information relating to the segmented computations corresponding to the plurality of selected structures.

BRIEF DESCRIPTION OF DRAWINGS

The features and advantages of the present invention will become apparent from the following detailed description of the invention when read with the accompanying drawings in which.

DETAILED DESCRIPTION

Figure 1:
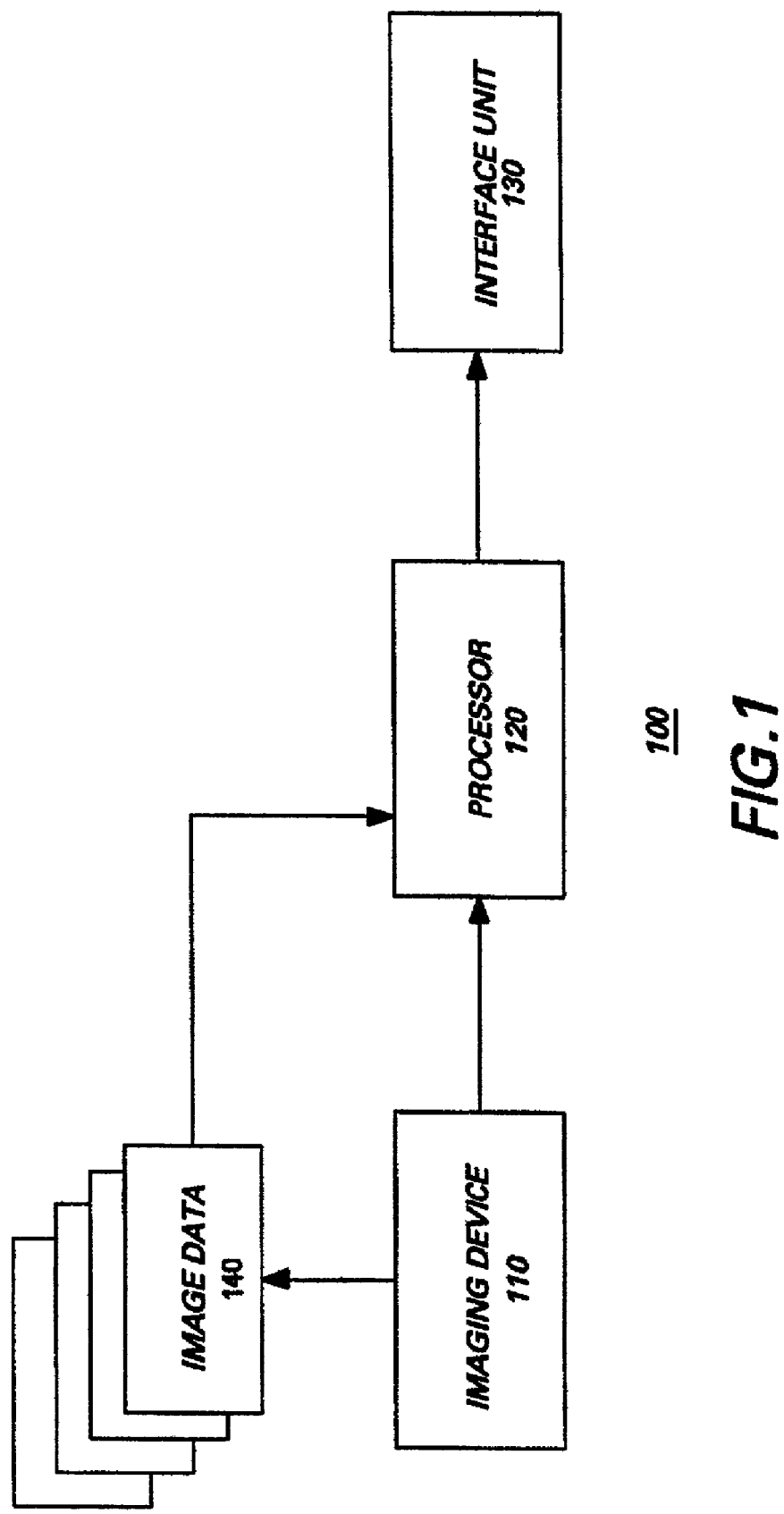
FIG. 1 is a block diagram illustration of a medical imaging system for which embodiments of the present invention are applicable.

Referring to FIG. 1, a general block diagram of a system 100 for disease detection is shown. System 100 includes an imaging device 110, which for the embodiments of the present invention is a magnetic resonance imaging (MRI) system used to generate a plurality of MR images.

During a MR imaging session, the patient is placed inside a strong magnetic field generated by a large magnet. Magnetized protons within the patient, such as hydrogen atoms, align with the magnetic field produced by the magnet. A particular slice of the patient is exposed to radio waves that create an oscillating magnetic field perpendicular to the main magnetic field. The slices can be taken in any plane chosen by the physician or technician (hereinafter the "operator") performing the imaging session. The protons in the patient's body first absorb the radio waves and then emit the waves by moving out of alignment with the field. As the protons return to their original state (before excitation), diagnostic images based upon the waves emitted by the patient's body are created. The MR image slices are reconstructed to provide an overall picture of the body area of interest. Parts of the body that produce a high signal are displayed as white in an MR image, while those with the lowest signals are displayed as black. Other body parts that have varying signal intensities between high and low are displayed as some shade of gray.

Once initial MR images have been obtained, the images are generally segmented. The segmentation process classifies the pixels or voxels of an image into a certain number of classes that are homogeneous with respect to some characteristic (i.e. intensity, texture, etc.). For example, in a segmented image of the brain, the material of the brain can be categorized into three classes: gray matter, white matter, and cerebrospinal fluid. Individual colors can be used to mark regions of each class after the segmentation has been completed. Once the segmented image is developed, surgeons can use the segmented images to plan surgical techniques.

FIG. 1 illustrates a medical imaging system 100 to which embodiments of the invention are applicable. The system includes an imaging device 110, a processor 120 and an interface unit 130. Imaging device 110 is adapted to generate a plurality of image data sets 140 and is, for example, a magnetic resonance (MR) scanner. In the context of MR, acquisition of image data is generally referred to as "scans". Processor 120 is configured to perform computations in accordance with embodiments of the present invention that will be described in greater detail with reference to FIGS. 2–12. Processor 120 is also configured to perform computation and control functions for well-known image processing techniques such as reconstruction, image data memory storage, segmentation and the like. Processor 120 may comprise a central processing unit (CPU) such as a single integrated circuit, such as a microprocessor, or may comprise any suitable number of integrated circuit devices and/or circuit boards working in cooperation to accomplish the functions of a central processing unit. Processor 120 desirably includes memory. Memory within processor 120 may comprise any type of memory known to those skilled in the art. This includes Dynamic Random Access Memory (DRAM), Static RAM (SRAM), flash memory, cache memory, etc. While not explicitly shown in FIG. 1, the memory may be a single type of memory component or may be composed of many different types of memory components. Processor 120 is also capable of executing the programs contained in memory and acting in response to those programs or other activities that may occur in the course of image acquisition and image viewing. As used herein, "adapted to", "configured" and the like refer to mechanical or structural connections between elements to allow the elements to cooperate to provide a described effect; these terms also refer to operation capabilities of electrical elements such as analog or digital computers or application specific devices (such as an application specific integrated circuit (ASIC)) that are programmed to perform a sequel to provide an output in response to given input signals.

Interface unit 130 is coupled to processor 120 and is adapted to allow human users to communicate with system 100. Processor 120 is further adapted to perform computations that are transmitted to interface unit 130 in a coherent manner such that a human user is capable of interpreting the transmitted information. Transmitted information may include images in 2D or 3D, color and gray scale images, and text messages regarding diagnosis and detection information. Interface unit 130 may be a personal computer, an image workstation, a hand held image display unit or any convention image display platform generally grouped as part of a CT or MRI system.

Referring further to FIG. 1, processor 120 is also adapted to perform the embodiments of segmentation methods that will be described in greater detail with reference to FIGS. 2–12.

All data gathered from multiple scans of the patient is to be considered one data set. Each data set can be broken up into smaller units, either pixels or voxels. When the data set is two-dimensional, the image is made up of units called pixels. A pixel is a point in two-dimensional space that can be referenced using two-dimensional coordinates, usually x and y. Each pixel in an image is surrounded by eight other pixels, the nine pixels forming a three-by-three square. These eight other pixels, which surround the center pixel, are considered the eight-connected neighbors of the center pixel. When the data set is three-dimensional, the image is displayed in units called voxels. A voxel is a point in three-dimensional space that can be referenced using three-dimensional coordinates, usually x, y and z. Each voxel is surrounded by twenty-six other voxels. These twenty-six voxels can be considered the twenty-six connected neighbors of the original voxel.

Figure 2:
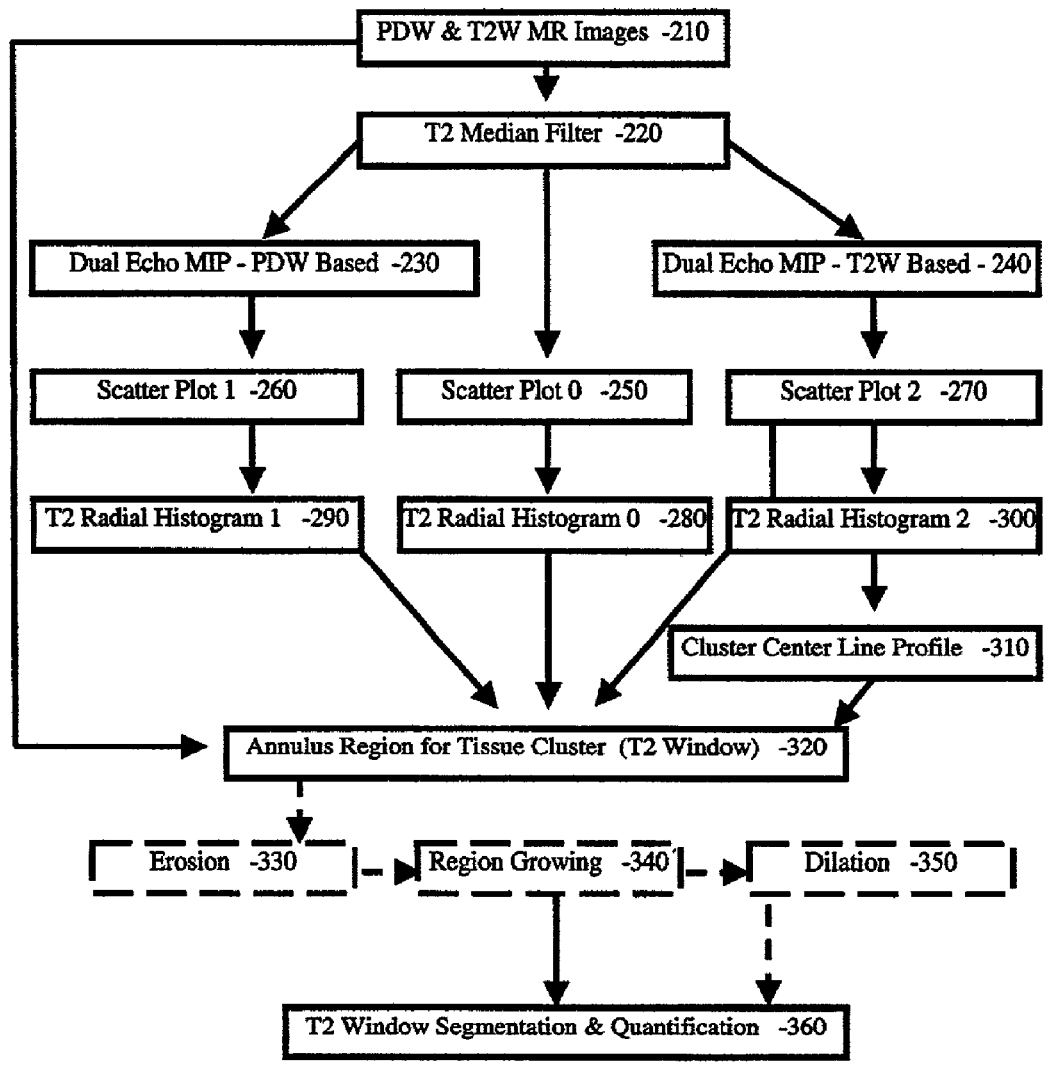
FIG. 2 is a schematic illustration of an exemplary embodiment of a method for segmenting MR images.

Referring to FIG. 2, an embodiment for segmenting MR images is provided that segments and quantifies brain structures from T2 dual echo MR images. As used herein, "T2", "T2 parameter" and the like refer to the time constant, or alternatively spin-spin relaxation time, T2 that is well known in the art of MR imaging. T2 is the time measurement for a given nuclei to return to be uniformly distributed around the static magnetic field (referred to as "B") once the RF pulse sequence is completed in the MR scan. There is a T2 value associated with a given tissue type or brain structure, thus the T2 value is useful in distinguishing selected tissue types in a MR image. Further, the given T2 value may be visualized differently between dual echo images. For example, the CSF typically has higher values in the second echo and the face has higher values in the first echo. In an exemplary embodiment, four different tissue clusters are classified in a scatter plot (air, cerebrospinal fluid (CSF), brain, and face). In further embodiments, additional image-processing techniques were implemented to reduce the spread of these clusters and subsequently generate tissue based information datasets (hereinafter referred to as "T2 windows") that encompass all the information needed to segment and subsequently quantify the corresponding tissues in an automatic fashion.

Figure 3:
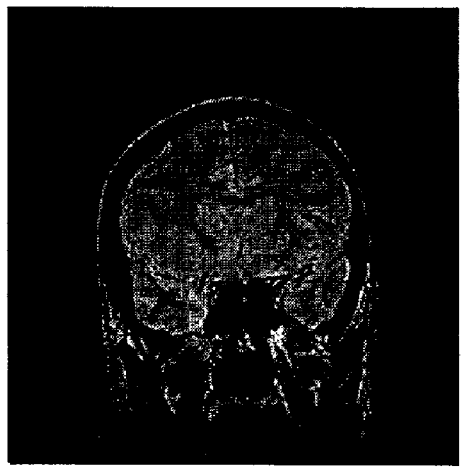
FIGS. 3 and 4 are dual echo images of types useful in the method of segmenting MR images shown in FIG. 2.
Figure 4:
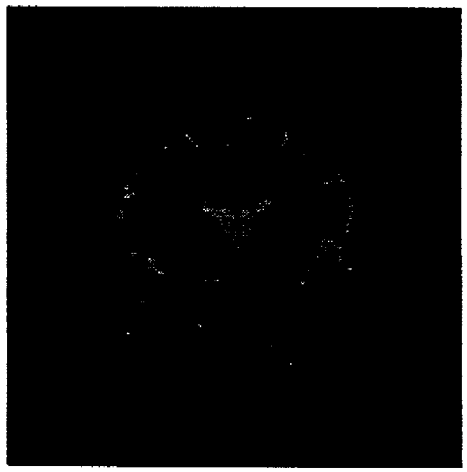

The input to the method shown in FIG. 2 are images acquired at step 210 by MRI scanning, for example on a 1.5 Tesla GE Signa MR scanner. The MR data consists of dual echo coronal images of the head. The dual echo was acquired by known methods using T2 spin echo pulse sequence. In an exemplary embodiment, the first echo, proton density weighted (PDW), was acquired at 30 msec and the second echo, T2 weighted (T2W), was acquired at 80 msec. The voxel size was 0.9375×0.9375×4 mm3. FIG. 3 illustrates the PDW image and FIG. 4 illustrates the T2W image. It is to be appreciated by those skilled in the art that other dual echo pulse sequences may also applicable to methods described herein.

Figure 5:
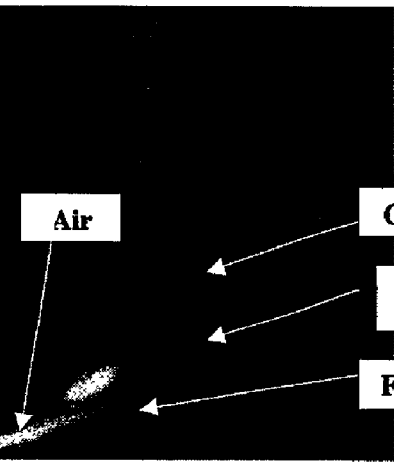
FIGS. 5 and 6 are graphical illustrations of a scatter plot and radial histogram, respectively, that are generated from the images of FIGS. 3 and 4 and useful in the method of segmenting MR images shown in FIG. 2; and, FIGS. 7–12 are graphical illustrations of segmented brain structures and their corresponding T2 windows derived by the method of segmenting MR images shown in FIG. 2.
Figure 6:
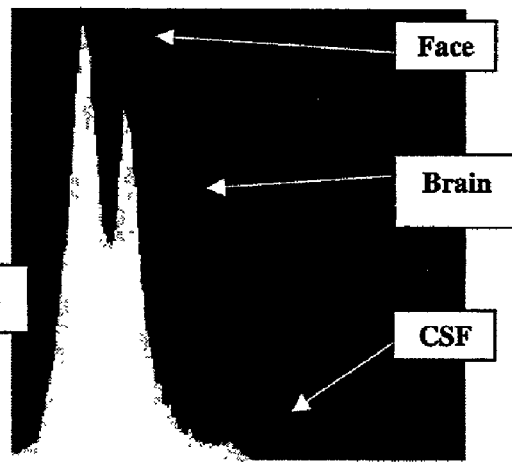

Before describing the segmentation method of the present invention as shown in FIG. 2, a brief description of the image processing steps will be described in greater detail below. Each of the image processing filters is applied to dual echo images shown in FIGS. 3 and 4 as described above. Referring to FIGS. 5–6, the main image processing steps are a scatter plot (SP), a T2 radial histogram (RH), a T2 median filter, and a dual echo MIP filter. Each of these steps is defined herein as an image processing computation based on T2 values and other information relating to T2.

Referring first to FIG. 5, the SP is a two-dimensional (2D) histogram constructed using the dual echo MR images. The abscissa consists of the range of voxel values of the first echo and the ordinate consists of the range of voxel values from of the second echo. The intensity value of a pixel in the scatter plot represents the frequency of occurrence of voxel values in the PWD image that are related to voxel values in T2W image at corresponding locations.

Referring to FIG. 6, the T2-RH is a histogram plotting the linear profile angle versus the area under the profile. The abscissa in the T2-RH represents the angle in the scatter plot. For instance, for zero-degree angle the profile follows on the abscissa of the SP. For 90-degree angle the profile follows the ordinate of the SP. The ordinate in T2-RH represents the sum of the intensity values (area under the profile) for a linear profile. The profile starts from the lower left in the scatter plot with an angle to the edge of the scatter plot. Note that the first 20 values in the profile were skipped because they represent part of the air cluster. A linear profile in the SP represents all the pixels in the corresponding brain image that have the same T2 values. T2 values extend along the profile mainly because of the difference in composition of proton density between tissues. T2 values for a tissue also extend in an angular fashion, thus forming clusters, mainly because of MR signal inhomogeneity, volume averaging, and coil shading artifacts.

Referring further to FIG. 2, the T2 median filter step 220 is first applied to the dual echo images and is adapted to reduce the spread of the T2 relationship values between the dual echo images. The T2 Median Filter applies the median of the calculated T2 values from the dual echoes instead of using the median of the pixel values from either echoes. The inputs to this filter are dual echo images (PDW and T2W images) and the outputs are dual echo filtered images that retain the MR T2 relationship. Note that the output of this step is a dual echo filtered data that maintains the tissue MR T2 parameter.

The dual echo maximum intensity projection (MIP) steps 230 and 240 adapted to enhance and amplify one peak distribution while suppressing other peaks in T2-RH.

Further, the dual echo MIP is adapted to maintain the spatial relationship between the dual echo images. In an embodiment for the dual echo MIP, processing selects a preferred echo and implements a MIP on it and then provides the spatial location of the implemented MIP. The spatial location is then used to extract values from the other echoes. Thus, each voxel retains the T2 characteristics between the MR echoes. The dual echo MIP can be based on the PDW image (230) or the T2W image (240). The dual echo PWD-MIP is adapted to enhance the face peak distribution while suppressing the cerebrospinal fluid (CSF) and the brain distributions in the T2-RH. Note that this filter outputs two echoes. In an exemplary embodiment, the first echo is the conventional MIP of the PWD images. The second MIP echo is generated using the MIP pixel locations from the PWD image to get the corresponding pixel values from the T2W image. The dual echo T2W-MIP outputs the second echo with the conventional MIP, while the first echo is generated using the MIP pixel location from the T2W image to get the corresponding pixel values from the PDW image. The MR T2 parameter is maintained in the dual echo MIP output images.

An embodiment for a method for segmenting magnetic resonance (MR) images of an anatomical body of interest, for example the brain, comprises classifying a plurality of selected structures within the body of interest based on a plurality of image processing computations as described above wherein the computations are adapted relate respective T2 relaxation times corresponding to each of the structures. Thereafter, the method comprises segmenting the MR images for each of the structures substantially concurrently based on the plurality of image computations. In an embodiment described herein, the anatomical body of interest is the brain and the plurality of structures include at least one of air, face tissue, brain tissue, cerebrospinal fluid (CSF), edema and tumor tissue. Desirably, the segmenting step is used in at least one of diagnosis, volume measurement and clinical research. As described above, the plurality of image processing computations comprises a scatter plot of voxel values of the MR images, at least one radial histogram, and a plurality of image processing filters. The image processing filters are adapted to enhance T2 values of the MR images and further relate dual echo image information.

T2 median filter step 220 is adapted to reduce the spread of the T2 relationship values between the dual echo images, as described above. The output of the T2 median filter is a dual echo filtered data set that is used as an input to the dual echo PWD-MIP step 230 as well as the T2W-MIP step 240. Next, three scatter plots (SP0, SP1, and SP2 shown as steps 250, 260 and 270, respectively) are generated and three T2 radial histograms (RH1, RH1, and RH2 shown as steps 280, 290 and 300, respectively in FIG. 2). SP0 and RH0 are generated directly from the filtered dual echo data. SP1 and RH1 are generated from the output of the dual echo PWD-MIP. SP2 and RH2 are generated from the output of the dual echo T2W-MIP.

The scatter plot and radial histogram information is used to detect peaks for the various brain structures. Using the gradient descent technique, the peak of the brain distribution (D1) is detected from the RH0, the peak of the face distribution (D0) from RH1, and the peak of the CSF distribution (D2) from RH2. From the angular profiles D0, D1, and D2, the peaks of these profiles are also determined using also a gradient descent technique. These peaks correspond to the centers of the tissue clusters (face, brain, and CSF) in the scatter plot, as shown in FIG. 5. The center for the air distribution is located in the lower left of the scatter plot. The tissue clusters described above are used to generate an information dataset for use in segmenting the various tissue types.

Figure 7:
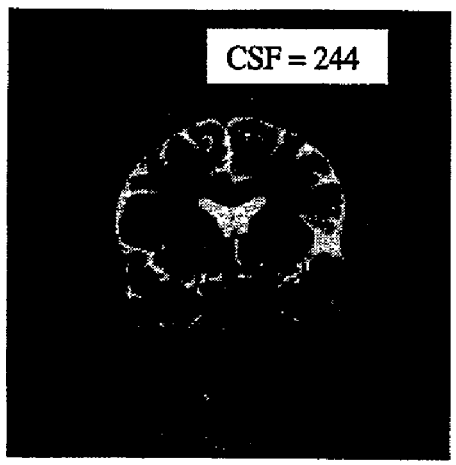
Figure 8:
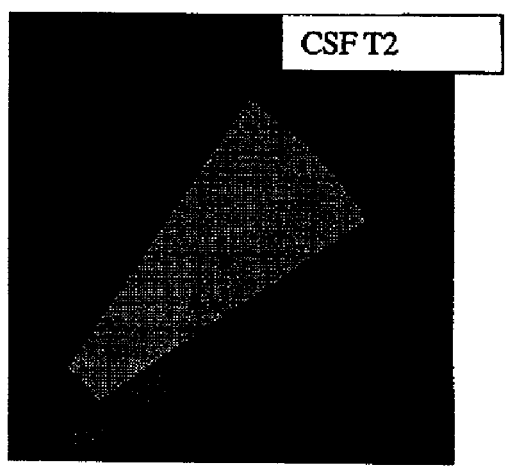
Figure 9:
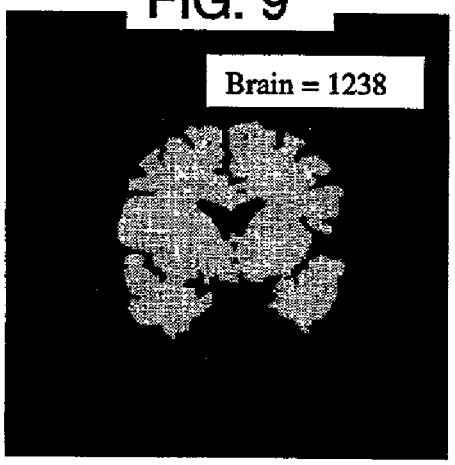
Figure 10:
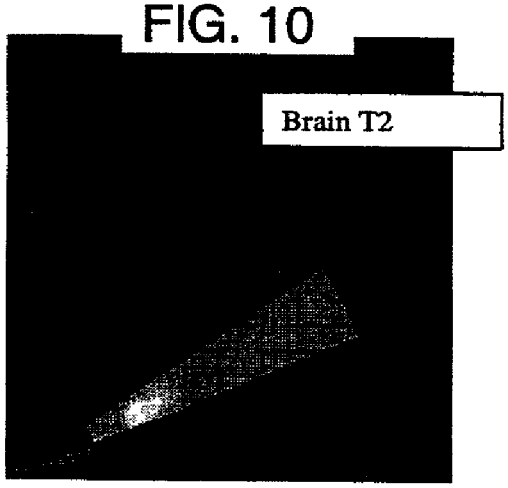
Figure 11:
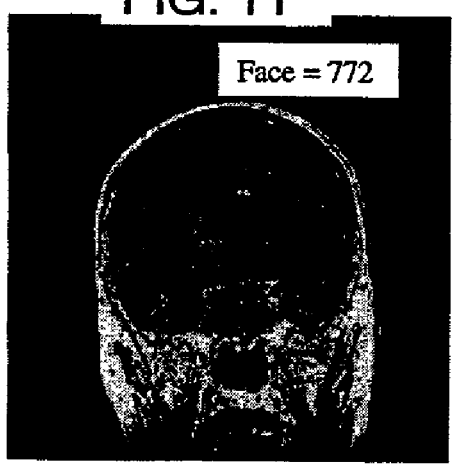
Figure 12:
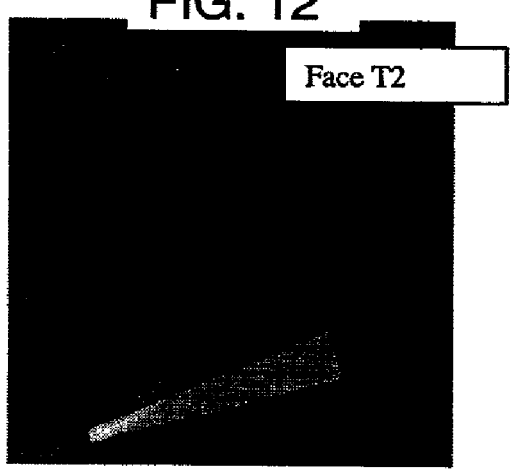

The output resulting from processing steps 210–300 shown in FIG. 2 results in an information dataset (hereinafter "T2 window") for each selected tissue type or structure. The information dataset, T2 window, is based on the image processing filters described above. The image processing filters are each adapted to extract, or alternatively enhance, various aspects of the T2 values corresponding to the selected structures of the brain. Referring to FIGS. 7–12, there is shown a graphical illustration of segmented brain structures and their corresponding T2 window. FIGS. 7 and 8 illustrate the segmented CSF and CSF T2 window, respectively. FIGS. 9 and 10 illustrate the segmented brain and brain T2 window, respectively. FIGS. 11 and 12 illustrate the segmented face and face T2 window, respectively.

Each of the T2 windows appears like an annulus region of interest that is determined by four parameters. These are the lower and upper angular limits, and the inner and outer circles. In an exemplary embodiment, the lower angular limit for the CSF T2 window was determined by averaging D1 and D0, where the upper limit was set to 60 degrees to compensate for noise and artifacts. Note that the maximum angle for any point with information in the scatter plot is expected to be at 45 degrees since the intensity values in the T2W image are always lower than the corresponding intensity values in the PDW image (MR T2 relaxation). The inner circle was set with a radius equal to half the distance between the center of the CSF cluster and the center of the air cluster. The outer circle was set to be three times larger than the inner circle. The face and brain T2 windows were determined with the same technique.

The CSF was segmented and quantified using the T2 windows from all of the corresponding voxels in the original MR images (FIGS. 7–12). However, the brain T2 window was used to segment the corresponding voxels from the original MR images.

In further embodiments and with further reference to FIG. 2, desirably an erosion filter 330, then region growing 340 with a seed taken from the center brain cluster, and finally dilation 350 are applied to segment the brain images. These additional steps remove misclassified voxels (typically the lower face area) that have similar brain T2 values. Subsequently, the volume was calculated for the brain and face.

In embodiments of the present invention, the T2 window datasets provide the needed information to segment the CSF, brain, and face in a totally automatic, and alternatively unsupervised, manner. Further, the T2 window computations for each structure within the brain are computed simultaneously, or alternatively concurrently, therefore enabling presentation of each of the segmented structures after processing. It is to be appreciated that the segmented structures are processed concurrently, thus reducing image processing time. Compared with conventional segmentation techniques requiring seed placement in a given structure and then waiting for subsequent segmentation processing, embodiments of the method shown in FIG. 2 provides the ability to segment a plurality of structures or tissues types automatically and substantially simultaneously.

Embodiments of the present invention have been described in the context of diagnosis and brain volume measurement. Further embodiments would be applicable to clinical research applications where there is a need to process multiple images and segment the multiple images for various structures. By employing the image processing computations described above, the tedious and manual intervention generally employed clinical research of multiple images is substantially reduced.

Further embodiments of the image processing computation would be adapting the computations to segment other structures such as edema, tumors in brain imaging. The embodiments described herein segments only the four mentioned structures (air, face, brain, and CSF). For instance, it does not differentiate between white matter from gray matter. The dual echo pixel values for these structures fall within the brain T2 window because the T2 difference between these structures is too small. Furthermore, if the brain has other structures such as edema of because of present head injury or tumor, the segmentation methods can be adapted to include the a special T2 edema window to segment edema. Similarly, the segmentation methods can be adapted to include a T2 window to segment for brain tumors. In further embodiments, the method for segmenting is adaptable to other anatomical bodies (e.g. heart or other organ) of interest that may benefit from image processing computations based on T2 values as described herein.

In an embodiment for the system shown in FIG. 1, a system is provided for automatically segmenting magnetic resonance (MR) images of an anatomical body of interest. The system comprises processor 120 coupled to MR image acquisition device 110 wherein processor 120 is adapted to perform concurrent segmentation computations for a plurality of selected structures within the anatomical body of interest. The system further comprises interface unit 130 coupled to the processor adapted to present information relating to the segmented computations corresponding to the plurality of selected structures.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

The invention claimed is:

1. An automatic method for segmenting magnetic resonance (MR) images of an anatomical body of interest comprising:

classifying a plurality of selected structures within the body of interest based on a plurality of image processing computations relating respective T2 relaxation times corresponding to each of the structures;

segmenting the MR images for each of the structures substantially concurrently based on the plurality of image computations; and wherein the plurality of image processing computations comprises a scatter plot of voxel values of the MR images, at least one radial histogram, and a plurality of image processing filters.

2. The method of claim 1 wherein the anatomical body of interest is the brain and the plurality of structures include at least one of air, face tissue, brain tissue, cerebrospinal fluid (CSF), edema and tumor tissue.

3. The method of claim 1 wherein the segmenting step is used in at least one of diagnosis, volume measurement and clinical research.

4. The method of claim 1 wherein the MR images are acquired by a dual echo pulse sequence.

5. The method of claim 4 wherein the dual echo pulse sequence comprises a first echo being a proton weighted density echo and a second echo being a T2 weighted echo.

6. The method of claim 1 wherein the image processing filters are adapted to enhance T2 values of the MR images and further relate dual echo image information.

7. An automatic method for segmenting magnetic Resonance (MR) images of a brain comprising:

acquiring the MR images by a dual echo pulse sequence to generate a first echo image data set and a second echo image data set;

computing a plurality of image processing computations relating respective T2 relaxation times corresponding to each of a plurality of selected structures within the brain;

segmenting the MR images for each of the structures substantially concurrently based on the plurality of image computations; and wherein the dual echo pulse sequence comprises a first echo being a proton weighted density echo and a second echo being a T2 weighted echo.

8. The method of claim 7 wherein the plurality of image processing computations comprises a scatter plot of voxel values of the MR images, at least one radial histogram, and a plurality of image processing filters.

9. The method of claim 7 wherein the segmenting step is used in at least one of diagnosis, volume measurement and clinical research.

10. A system for automatically segmenting magnetic resonance (MR) images of an anatomical body of interest comprising:

a processor coupled to an MR image acquisition device, the processor being adapted to perform concurrent segmentation computations for a plurality of selected structures within the anatomical body of interest;

an interface unit coupled to the processor adapted to present information relating to the segmented computations corresponding to the plurality of selected structures;

wherein the MR images are acquired by a dual echo pulse sequence that comprises a first echo being a proton weighted density echo and a second echo being a T2 weighted echo.

11. The system of claim 10 wherein the anatomical body of interest is the brain and the plurality of structures include at least one of air, face tissue, brain tissue, cerebrospinal fluid (CSF), edema and tumor tissue.

12. The system of claim 10 wherein the segmentation computations are used in at least one of diagnosis, volume measurement and clinical research.

13. A method for filtering dual echo images acquired by magnetic resonance (MR) imaging comprising:
  selecting a desired echo;
  implementing a maximum intensity projection (M1P) on the selected echo;
  identifying a spatial location of the implemented MIP wherein the spatial location is then used to extract values from subsequent echoes; and
  wherein the dual echo images include a proton density weighted (PDW) image and a T2 weighed (T2W) image.

14. The method of claim 13 wherein the filtering method is used in brain imaging and segmentation of structures within the brain.

* * * * *